(12) United States Patent
Sharif

(10) Patent No.: US 8,449,774 B2
(45) Date of Patent: May 28, 2013

(54) SEPARATION PROCESS

(75) Inventor: Adel Sharif, Guildford (GB)

(73) Assignee: Surrey Aquatechnology Limited, Guildford, Surrey (GB)

( * ) Notice: Subject to any disclaimer, the term of this patent is extended or adjusted under 35 U.S.C. 154(b) by 890 days.

(21) Appl. No.: 12/312,065

(22) PCT Filed: Oct. 15, 2007

(86) PCT No.: PCT/GB2007/003904
§ 371 (c)(1), (2), (4) Date: Jun. 23, 2009

(87) PCT Pub. No.: WO2008/050087
PCT Pub. Date: May 2, 2008

(65) Prior Publication Data
US 2010/0206743 A1    Aug. 19, 2010

(30) Foreign Application Priority Data
Oct. 25, 2006  (GB) ................................ 0621247.6

(51) Int. Cl.
*B01D 11/00* (2006.01)
*B01D 63/00* (2006.01)
*C02F 1/44* (2006.01)

(52) U.S. Cl.
USPC ..... 210/644; 210/652; 210/416.1; 210/257.2; 210/641

(58) Field of Classification Search
USPC ............... 210/652, 244, 249, 641, 650, 644, 210/649, 416.1, 257, 2
See application file for complete search history.

(56) References Cited

U.S. PATENT DOCUMENTS

| | | | |
|---|---|---|---|
| 3,906,250 A | 9/1975 | Loeb | |
| 4,244,351 A | 1/1981 | Loeb et al. | |
| 4,283,913 A | 8/1981 | Loeb | |
| 4,408,459 A | 10/1983 | Yogev | |
| 4,781,837 A * | 11/1988 | Lefebvre | 210/640 |
| 5,098,575 A | 3/1992 | Yaeli | |
| 6,351,205 B1 * | 2/2002 | Armstrong | 338/114 |
| 7,560,029 B2 * | 7/2009 | Mc Ginnis | 210/644 |
| 7,566,402 B2 * | 7/2009 | Thorsen et al. | 210/652 |
| 7,727,400 B2 * | 6/2010 | Flynn | 210/652 |
| 7,799,221 B1 * | 9/2010 | MacHarg | 210/321.66 |
| 7,871,522 B2 * | 1/2011 | Stover et al. | 210/652 |
| 8,123,948 B2 * | 2/2012 | Jensen | 210/652 |
| 2005/0145568 A1 * | 7/2005 | Mc Ginnis | 210/639 |
| 2006/0032808 A1 * | 2/2006 | Hauge | 210/321.65 |
| 2006/0237366 A1 | 10/2006 | Al-Mayahi | |
| 2006/0245909 A1 * | 11/2006 | Stover | 415/1 |
| 2010/0206743 A1 * | 8/2010 | Sharif | 205/687 |
| 2011/0233137 A1 * | 9/2011 | Cath et al. | 210/644 |

* cited by examiner

*Primary Examiner* — Ana Fortuna
(74) *Attorney, Agent, or Firm* — Whyte Hirschboeck Dudek S.C.

(57) ABSTRACT

A process for separating dissolved components from a solution, said process comprising a) introducing a first solution into a solar pond and irradiating the solution with solar energy, such that temperature and concentration gradients are established, whereby the temperature and concentration of solute at the base of the pond is greater than the temperature and concentration of solute at the surface of the pond, b) introducing a portion of the first solution from the pond into a first osmosis unit, and contacting the portion with one side of a selectively permeable membrane, c) contacting the other side of the selectively permeable membrane with a second solution having a lower solute concentration than the portion of first solution from the pond, such that solvent from the second solution passes across the membrane to dilute and pressurize the portion of first solution, d) removing the diluted portion of first solution from the first osmosis unit, and e) using the pressure generated in the diluted portion of first solution to drive a solution of dissolved components through a membrane to separate at least some of the dissolved components from the solution.

15 Claims, 4 Drawing Sheets

SEPARATION PROCESS

This application claims priority to PCT application No. PCT/GB2007/003904 filed on Oct. 15, 2007, which claims priority to United Kingdom application No. 0621247.6 filed on Oct. 25, 2006.

The present invention relates to a process for separating dissolved components from a solution. The present invention also relates to a process for separating a solvent from a solution.

Various methods for separating dissolved components from solutions are known. For example, dissolved components can be removed from seawater by reverse osmosis. In reverse osmosis, seawater is placed on one side of a semi-permeable membrane and subjected to an elevated pressure. The other side of the membrane is maintained at atmospheric pressure. The resulting pressure difference causes water to flow across the membrane, leaving a salty concentrate on the pressurised side of the membrane.

To generate the high pressures required to drive the reverse osmosis process, seawater is generally pumped into the reverse osmosis unit at pressures of 5 to 8 MPa. The pumps necessary to provide these high pressures are expensive. Operational costs are also high.

According to a first aspect of the present invention, there is provided a process for separating dissolved components from a solution, said process comprising
 a) introducing a first solution into a solar pond and irradiating the solution with solar energy, such that concentration and temperature gradients are established, whereby the temperature and concentration of solute at the base of the pond are greater than the temperature and concentration of solute at the surface of the pond,
 b) introducing a portion of the first solution from the pond into a first osmosis unit, and contacting the portion with one side of a selectively permeable membrane,
 c) contacting the other side of the selectively permeable membrane with a second solution having a lower solute concentration (lower osmotic potential) than the portion of first solution from the pond, such that solvent from the second solution passes across the membrane to dilute and pressurise the portion of first solution,
 d) removing the diluted portion of first solution from the first osmosis unit, and
 e) using the pressure generated in the diluted portion of first solution to drive a solution of dissolved components through a membrane to separate at least some of the dissolved components from the solution.

In step a), a first solution is introduced into a solar pond and irradiated with solar energy, such that a concentration gradient is established, whereby the concentration of solute at the base of the pond is greater than the concentration of solute at the surface of the pond. The solar energy also causes a temperature gradient to be established, whereby the temperature at the base of the pond is higher than the temperature at the surface of the pond. As a result, the solution at the base of the pond is generally of a higher concentration (higher osmotic potential) and higher temperature than the solution at the surface of the pond.

The solar pond in step a) provides a means of "collecting" solar energy in the form of heat and solute concentration gradients. In operation, the solar pond has a higher temperature and solute concentration at the bottom of the pond and a lower temperature and solute concentration at the top of the pond. The solar energy used to establish the necessary temperature and concentration gradients may be supplemented with other forms of energy, such as wind energy. Salts (e.g. soil salts) may also be added to the solar pond to maintain the desired concentration gradient. Alternatively or additionally, waste streams from industrial plants with high salt concentrations may be introduced into the solar pond. Examples of suitable streams include salt streams from desalination plants and blow down from cooling towers. A suitable solar pond is described in U.S. Pat. No. 4,244,351, where the pond is saturated with a salt having a solubility which is a direct function of temperature. Suitable solar ponds are also described in U.S. Pat. No. 4,408,459 and U.S. Pat. No. 4,244,351.

In step b), a portion of the first solution is introduced into a first osmosis unit. Preferably, a portion of the first solution from the base of the pond is introduced into the first osmosis unit. In the osmosis unit, the portion of first solution is contacted with one side of a selectively permeable membrane. The other side of the membrane is contacted with a second solution having a lower solute concentration (lower osmotic potential) than the portion of first solution from the pond (step c). As a result of this difference in osmotic potential, solvent (preferably, liquid solvent) from the second solution passes across the membrane to dilute and pressurise the portion of first solution (by osmosis). Once solvent from the second solution has passed across the membrane, the concentrated second solution may optionally be recycled to the solar pond.

The portion of the first solution may be pressurised to a pressure of 1 to 15 MPa, preferably 3 to 8 MPa in step c).

Any suitable membrane may be used in the first osmosis unit (see steps b and c). Preferably, the membrane employed has an average pore size of from 1 to 80 Angstroms, more preferably, 2 to 50 Angstroms. In a preferred embodiment, the membrane has an average pore size of from 5 to 30 Angstroms. The pore size of the membrane may be selected depending on the size of the solutes that require separation.

Suitable selective membranes include integral membranes and composite membranes. Specific examples of suitable membranes include membranes formed of cellulose acetate (CA), cellulose triacetate (CTA), such as/similar to those used in the study of McCutcheon et al., Desalination 174 (2005) 1-11 and membranes formed of polyamide (PA). An array of membranes may be employed. Other examples of suitable membranes for the osmosis unit(s) include Toyobo Hollow Fibre both open ended tubular modules (Hollowsep).

The membrane may be planar or take the form of a tube or hollow fibre. If desired, the membrane may be supported on a supporting structure, such as a mesh support.

In one embodiment, one or more tubular membranes may be disposed within a housing or shell. The first solution may be introduced into the housing, whilst the second solution may be introduced into the tubes. As the solute concentration of the first solution is higher (i.e. the solution has a higher osmotic potential) than that of the second solution, solvent will diffuse across the membrane from the second solution into the first solution. Thus, the first solution will become increasingly diluted and the second solution, increasingly concentrated. The diluted first solution may be recovered from the housing, whilst the concentrated second solution may be removed from the interior of the tubes.

When a planar membrane is employed, the sheet may be rolled such that it defines a spiral in cross-section.

In step d), the diluted and pressurised portion of first solution is removed from the first osmosis unit. Optionally, the removed portion may be pressurised further, for example, using a booster pump. The pressure generated in the removed portion is then transferred to a solution of dissolved components (step e). Thus pressurised, the solution of dissolved components is driven (preferably in liquid form) through a membrane (e.g. a reverse osmosis or nanofiltration membrane) to separate at least some of the dissolved components from the remainder of the solution. In effect, therefore, solar energy is used to generate the pressure necessary to drive a solution of dissolved components through a separation membrane, thereby separating at least some of the dissolved components from the solution. The filtrate passing through the membrane has a reduced concentration of dissolved components. Preferably, the filtrate is substantially free of dissolved components and may be used for a variety of applications (for example, as clean water for irrigation, cleaning and/or drinking; or as water for industrial use, for example, for cooling or heating; or for enhanced oil recovery, for example, as injection water for oil recovery).

Once pressure from the portion of first solution has been transferred to the solution of dissolved components, the depressurised portion of first solution may optionally be recycled to the (preferably, bottom of the) solar pond. Prior to being recycled, the solution may optionally be treated to remove any suspended particles. Alternatively or additionally, additives may be added to the solution to inhibit/prevent fouling and/or scaling.

At least 30%, preferably at least 50%, more preferably at least 70%, and even more preferably at least 80% of the pressure of the pressurised portion of first solution is transferred to the solution of dissolved components to drive the solution of dissolved components through the membrane of step e).

The solution dissolved components may be pressurised such that it contacts the membrane of step e) at a pressure of 2 to 15 MPa, preferably 3 to 8 MPa.

Any suitable membrane may be employed in step e). Suitable membranes include those described in connection with the first osmosis unit (see steps b and c). Preferably, a nanofiltration membrane is used. Such membranes have average pore sizes of 5 to 80 Angstroms, more preferably, 10 to 50 Angstroms, for example 15 to 30 Angstroms. Alternatively, a reverse osmosis membrane may be used. Such membranes have average pore sizes of approx. 5-10 Angstroms. Generally speaking, the larger the pore size, the higher the throughput through the membrane.

Examples of suitable nanofiltration membranes include Desal-5 (Desalination Systems, Escondido, Calif.), NF 70, NF 50, NF 40, NF 40 HF membranes (FilmTech Corp., Minneapolis, Minn.), SU 600 membrane (Toray, Japan) and NRT 7450 and NTR 7250 membranes (Nitto Electric, Japan).

The solution of dissolved components may be formed by dissolving selected components in an appropriate solvent (e.g. water). By selecting the components accordingly, the risk of membrane fouling in separation step e) may be reduced. Moreover, the specific components may be selected such that they can be easily separated by the chosen membrane.

Suitable components include organic compounds and inorganic compounds. Suitable organic compounds include sugars, such as glucose, fructose and sucrose.

Suitable inorganic compounds include acids, bases and salts. Mixtures of two or more inorganic compounds may be employed. In a preferred embodiment, salts are employed.

The salt may be a metal salt or an ammonium salt. Suitable metal salts include salts of Groups I to III metals. Examples of suitable Group I metal salts include salts of sodium and potassium. Examples of suitable Group II metal salts include salts of magnesium, calcium, strontium and barium. Examples of suitable Group III salts include salts of aluminium. Salts of complex cations may also be employed.

Where ammonium salts are employed, such salts may be salts of substituted or unsubstituted ammonium ions. Where substituted ammonium ions are used, these may be substituted with alkyl groups, such as $C_1$ to $C_{20}$ alkyl groups.

The salts may be formed of cations having an average diameter of greater than 10 Angstroms in solvated (e.g. hydrated) form. Preferably, the metal cations have diameters from 11 to 100 Angstroms, more preferably, from 15 to 50 Angstroms in solvated (e.g. hydrated) form. Such cations can be separated using large pore membranes, such as nanofiltration membranes.

Suitable anionic species include fluorides, chlorides, bromides, iodides, sulphates, sulphites, sulphides, carbonates, hydrogencarbonates, nitrates, nitrites, nitrides, phosphates, hydrogenphosphates, aluminates, borates, bromates, carbides, chlorides, perchlorates, hypochlorates, chromates, fluorosilicates, fluorosilicates, fluorosuiphates, silicates, cyanides and cyanates.

The anions preferably have an average diameter of at least 5 Angstroms in solvated form. Preferably, the anions have diameters from 5 to 50 Angstroms, more preferably, from 10 Angstroms to 40 Angstroms, and more preferably, 20 to 30 Angstroms in solvated form. Anions having an average diameter of at least 10 Angstroms in solvated form may be separated using large pore membranes, such as nanofiltration membranes.

Preferred salts include magnesium sulfate ($MgSO_4.6H_2O$ or $MgSO_4.7H_2O$), magnesium chloride ($MgCl_2.6H_2O$), sodium sulfate ($Na_2SO_4.10H_2O$), calcium chloride ($CaCl_2.2H_2O$ or $CaCl_2.6H_2O$), Borax ($Na_2B_4O_7$) disodium hydrogenphosphate ($Na_2HPO_4.12H_2O$) and potassium alum ($24H_2O$) Generally speaking, these salts can be separated using nanofiltration and reverse osmosis (RO) membranes in single or multiple stages of operation. In other words, one or more membrane separation units may be used to carry out the nanofiltration/reverse osmosis step(s). Sodium chloride and potassium chloride may also be used. Typically, these salts are separated using RO membranes.

Water soluble polymers may also be used as the dissolved components.

Additionally anti-microbial agent(s), anti-corrosion agent(s), pH adjuster(s) and anti-scaling agent(s) may be added to the solution of dissolved components. Examples of suitable additives include acids, such as carboxylic acids; alkalis, such as hydroxides; polymers, such as xanthan gum, polyacrylamide and dextrin; protein, lipoprotein, lipid and glyco-lipid surfactants; and anti-scaling agents, such as penta-phosphonate. These additives may be re-used in the process of the present invention they will be recycled in a closed loop.

The solution of dissolved components that is contacted with the membrane of step e) typically has an osmotic pressure of 0.1 to 15 MPa, preferably 3 to 8 MPa. More preferably, the solution has an osmotic pressure of 0.5 to 6 MPa In certain embodiments of the invention, steps are taken to ensure that the concentration and/or osmotic potential of the solution of dissolved components is at its target value prior to contact with the membrane. For example, the solution may be treated by electrodialysis, electrodialysis reversal and electrochemical treatment (e.g. capacitive deionisation ion-exchange). Alternatively or additionally, the temperature and/or pH of the solution may be controlled so as to alter the concentration of the solution accordingly and/or its osmotic pressure (potential).

Optionally, the pressure generated in the diluted portion of first solution of step c) may also be used to drive the portion of first solution from the pond into the first osmosis unit in step b). In other words, some of the pressure generated in the diluted portion of the first solution removed from the osmosis unit in step d) may be transferred to the portion of first solution removed from the pond in step b). Alternatively or additionally, a pump may be employed to drive the portion of first solution from the pond into the first osmosis unit in step b).

Any suitable means of transferring pressure from one fluid to another may be used to transfer the pressure generated in the diluted portion of first solution of step c) to the solution of dissolved components in step e). For example, a pressure exchange system may be used. Any suitable means of transferring pressure from one fluid to another may also be used to transfer the pressure generated in the diluted portion of first solution of step c) to the portion of first solution from the pond into the first osmosis unit in step b). Preferably, a pressure exchange system is used. Pressure exchangers use the principle of positive displacement to pressurise a low pressure liquid by contact with a high pressure liquid. The technique provides a high efficiency of energy recovery.

Preferably, the process of the present invention further comprises the steps of:
providing an initial solution,
using a first portion of the initial solution as the first solution of step a),
using a second portion of the initial solution as the second solution in step c), and,
optionally, using a third portion of the initial solution as or to form the solution of dissolved components that is passed through the membrane in step e).

In this embodiment of the invention, the initial solution is split into at least two streams to provide the first solution and second solution. For example, the initial solution may be seawater, brackish water, river water, lake water and waste streams from industrial or agricultural processes may be used as the initial solution. Mixtures of such streams may also be employed. The initial solution may be pre-treated, for example, by membrane filtration, to remove suspended particles. Alternatively other conventional pre-treatment techniques may be used. Chemicals may also be added to the initial solution to prevent or inhibit biological fouling and/or scaling.

In a preferred embodiment, seawater is used as the initial stream. The seawater used as the first solution is introduced into a solar pond and subjected to solar energy. As a result of this irradiation, concentration and temperature gradients are established in the pond, whereby the seawater at the base of the pond is of a higher concentration and temperature than the seawater at the surface of the pond.

The seawater from the base of the solar pond may be removed and contacted with one side of a selectively permeable membrane. This removed stream has a higher solute concentration (higher osmotic potential) than the initial seawater stream. Thus, when a second portion of the initial seawater stream (second solution) is contacted with the opposite side of the membrane, water from the second stream flows across the membrane by osmosis, diluting and pressurising the concentrated seawater stream from the solar pond. The pressure generated in this stream may be used to drive a solution of dissolved components through a membrane (see step e). Once water from the second solution has passed across the membrane, the concentrated second solution may optionally be recycled to the solar pond.

As described above, the initial solution may optionally be used to form the solution of dissolved components that is passed through the membrane in step e). For example, the initial solution may be used to provide the solvent for diluting the solution of dissolved components. In one embodiment, the components are first dissolved in a solvent to provide a concentrated solution of dissolved components. By selecting the components accordingly, the risk of membrane fouling in step e) may be reduced. Furthermore, the components may be selected such that they are easily separated by the membrane in step e).

Suitable components for forming the solution of dissolved components are described above. The solution of dissolved components may have an osmotic pressure of 0.1 to 15 MPa, preferably 3 to 6 MPa, and more preferably 2 to 5 MPa. As described above, anti-scalant, corrosion inhibitors and anti-fouling agents can also be added to the solution of dissolved components. These additives may be recirculated in a closed loop. The solution Once formed, the concentrated solution of dissolved components is contacted with one side of a selectively permeable membrane in an additional osmosis unit. Some of the initial solution (e.g. seawater, brackish water and/or waste streams from industrial or agricultural processes) may then be contacted with the opposite side of the selectively permeable membrane, such that solvent from the initial solution passes across the selectively permeable membrane to dilute the concentrated solution of dissolved components.

Any suitable membrane may be used in the additional osmosis unit. Suitable membranes are RO membranes preferably for low pressure operation (less than 3 MPa). Typically, RO membranes have pore sizes of 5 to 10 Angstroms.

Suitable membranes include integral membranes and composite membranes. Specific examples of suitable membranes include membranes formed of cellulose acetate (CA), cellulose triacetate (CTA) and membranes formed of polyamide (PA). An array of membranes may be employed.

The membrane may be planar or take the form of a tube or hollow fibre. If desired, the membrane may be supported on a supporting structure, such as a mesh support.

In one embodiment, one or more tubular membranes may be disposed within a housing or shell. The concentrated solution of dissolved components may be introduced into the housing, whilst the initial solution may be introduced into the tubes. As the solute concentration (or osmotic potential) of the concentrated solution of dissolved components is higher than that of the initial solution, solvent will diffuse across the membrane from the initial solution into the concentrated solution. Thus, the concentrated solution of dissolved components will become increasingly diluted and the initial solution, increasingly concentrated. Once diluted, the solution of dissolved components may be recovered from the housing, whilst the concentrated initial solution may be removed from the interior of the tubes. Alternatively, the concentrated solution of dissolved components may be introduced into the tubes, whilst the initial solution may be introduced into the shell or housing.

When a planar membrane is employed, the sheet may be rolled such that it defines a spiral in cross-section.

The additional osmosis unit may be operated at relatively low pressure. For example, the flow of solvent from the initial solution across the membrane may exert a pressure of 0.1 to 4.0 MPa, preferably 0.1 to 1.5 MPa on the membrane.

The additional osmosis unit may be located in close proximity to the source of initial solution. For example, where the initial solution is seawater, the further osmosis unit may be submerged or installed at sub-sea level to reduce pumping and brine disposal costs.

The additional osmosis unit may consist of a single unit or multiple sub-units.

Once solvent from the initial solution has passed across the selectively permeable membrane, the concentrated initial solution may be recycled to the solar pond.

As described above, the initial solution may be split into at least two streams to provide the first solution and second solution. As an alternative to the seawater, brackish water and the waste streams described above, the initial stream may also be formed by dissolving a solute in a solvent to provide an initial solution precursor, contacting the initial solution precursor with one side of a selectively permeable membrane in a further osmosis unit, and contacting the opposite side of said selectively permeable membrane with a solution having a lower solute concentration (or lower osmotic potential) than the initial solution precursor, such that solvent from the solution having said lower solute concentration passes across the membrane to dilute the initial solution precursor to form the initial solution.

The further osmosis unit may consist of a single unit or multiple sub-units.

By selecting the solute(s) used to form the initial solution accordingly, the resulting solution may be substantially free of contaminants, such as algae and other biological contaminants found in seawater. Accordingly, the risk of membrane fouling is significantly reduced. Furthermore, the solutes may be selected to optimise the separation steps of the process. In this regard, the solutes may be selected such that they can be easily separated by the membranes used in the process. Appropriate recycling streams may be employed to ensure that this initial solution is circulated in the process in a substantially closed loop, with additional solutes/solvents added periodically, if and when necessary.

The solution having a lower solute concentration (or lower osmotic potential) than the initial solution precursor may be selected from one or more of seawater, lake water, river water, brackish water and waste streams from industrial or agricultural processes. Preferably, seawater is employed.

Since the solution having a lower solute concentration than the initial solution precursor is fed into the further osmosis unit, the further osmosis unit may be located in close proximity to the source of the solution having a lower solute concentration (or lower osmotic potential). For example, where the solution is seawater, the further osmosis unit may be submerged or located installed at sub-sea level to reduce pumping anti brine disposal costs.

The further osmosis unit may be operated at relatively low pressure. For example, the flow of solvent from the initial solution across the membrane may exert a pressure of 0.1 to 4.0 MPa, preferably 0.1 to 1.5 MPa on the membrane.

Any suitable membrane may be used in the further osmosis unit. Suitable membranes are described in connection with the additional osmosis unit.

As well as using the initial solution produced from the solution having a lower solute concentration (or lower osmotic potential) above as the first solution and the second solution, the initial solution may optionally be used as the solution of dissolved components that is passed through the membrane in step e). In other words, a portion the initial solution may be contacted with the membrane of step e). As described above, it is possible to control the concentration (and/or osmotic potential) of the solution of dissolved components prior to contact with the membrane. For example, the solution may be treated by electrodialysis, electrodialysis reversal, electromagnetic and electrochemical treatment (e.g. capacitive deionisation and ion-exchange) or any field separable method. Alternatively or additionally, the temperature and/or pH of the solution may be controlled so as to alter the concentration and/or osmotic potential of the solution accordingly. As well as carrying out such steps prior to contacting the solution of dissolved components prior to contact with the membrane in step e), such steps may alternatively or additionally be carried out after contact with the membrane of step e).

Once the solution of dissolved components is passed through the membrane is step e), a concentrated solution of dissolved components is retained on one side of the membrane. This concentrated solution may be recycled to the further osmosis unit. Prior to being reintroduced into the further osmosis unit, it is possible to remove further solvent from the concentrated solution of dissolved components, for example, by thermal methods, such as distillation, where the heat energy may optionally be obtained from the bottom of the solar pond. Examples of thermal distillation methods include multi-stage flash (MSF), multi-effect distillation (MED) and vacuum compression (VC). Membrane distillation may also be used.

The filtrate produced in step (e) may be stabilized, for example, by post-treatment stages. For example, a thermal separation unit that separates dissolved solutes by crystallisation may be used to extract further solvent from the filtrate. A suitable system is described in WO 2005/012185.

In an alternative embodiment, the initial solution produced above may be used to form the solution of dissolved components. For example, a portion of the initial solution produced may be introduced into another osmosis unit(s) and contacted with one side of a selectively permeable membrane. A solution of dissolved components that is more concentrated (or has a higher osmotic potential) than the portion of initial solution is contacted with the other side of the membrane in another osmosis unit, such that solvent from the portion of initial solution passes across the membrane to dilute the concentrated solution of dissolved components. By forming the solution of dissolved components in this way, a solution of dissolved components that is different from the initial solution may be separated in step e).

In the above embodiment, the components used to form the solution of dissolved components include organic compounds and inorganic compounds. Suitable organic compounds include sugars, such as glucose, fructose and sucrose.

Suitable inorganic compounds include acids, bases and salts. Mixtures of two or more inorganic compounds may be employed. In a preferred embodiment, salts are employed.

The salt may be a metal salt or an ammonium salt. Suitable metal salts include salts of Groups I to III metals. Examples of suitable Group I metal salts include salts of sodium and potassium. Examples of suitable Group II metal salts include salts of magnesium, calcium, strontium and barium. Examples of suitable Group III salts include salts of aluminium. Salts of complex cations may also be employed.

Where ammonium salts are employed, such salts may be salts of substituted or unsubstituted ammonium ions. Where substituted ammonium ions are used, these may be substituted with alkyl groups, such as $C_1$ to $C_{20}$ alkyl groups.

The salts may be formed of cations having an average diameter of greater than 10 Angstroms in solvated (e.g. hydrated) form. Preferably, the metal cations have diameters from 11 to 100 Angstroms, more preferably, from 15 to 50 Angstroms in solvated (e.g. hydrated) form. Such cations can be separated using large pore membranes, such as nanofiltration membranes.

Additionally salts used in non-convective solar ponds and disclosed in U.S. Pat. No. 4,244,351 may be used.

Suitable anionic species include fluorides, chlorides, bromides, iodides, sulphates, sulphites, sulphides, carbonates, hydrogencarbonates, nitrates, nitrites, nitrides, phosphates, hydrogenphosphates, aluminates, borates, bromates, carbides, chlorides, perchlorates, hypochlorates, chromates, fluorosilicates, fluorosilicates, fluorosulphates, silicates, cyanides and cyanates.

The anions preferably have an average diameter of at least 5 Angstroms in solvated form. Preferably, the anions have diameters from 1 to 50 Angstroms, more preferably, from 10 Angstroms to 40 Angstroms, and more preferably, 20 to 30 Angstroms in solvated form. Anions having an average diameter of at least 10 Angstroms in solvated form may be separated using large pore membranes, such as nanofiltration membranes.

Preferred salts include magnesium sulfate ($MgSO_4.6H_2O$ or $MgSO_4.7H_2O$), magnesium chloride ($MgCl_2.6H_2O$), sodium sulfate ($Na_2SO_4.10H_2O$), calcium chloride ($CaCl_2.2H_2O$ or $CaCl_2.6H_2O$), Borax ($Na_2B_4O_7$), (disodium hydrogenphosphate ($Na_2HPO_4.12H_2O$) and potassium alum ($24H_2O$) Typically, these salts can be separated using nanofiltration and RO membranes. Sodium chloride and potassium chloride may also be used. Generally, these salts are separated using RO membranes.

Water soluble polymers may also be used to form the solution of dissolved components As described above, the solution of dissolved components may additionally include anti-scalant, anti-corrosion and anti-fouling agents. These agents may be recirculated in a closed loop. The solution of dissolved components may have an osmotic pressure (potential) of 2 to 8 MPa, preferably 3 to 6 MPa and more preferably 2 to 5 MPa (see above).

The osmosis unit(s) used to dilute the concentrated solution of dissolved components may be operated at relatively low pressure. For example, the flow of solvent from the initial solution across the membrane may exert a pressure of 0.1 to 5.0 MPa, preferably 0.1 to 2.0 MPa on the membrane.

Any suitable membrane may be used in the osmosis unit used to form the solution of dissolved components. Suitable membranes are described in relation to the additional osmosis unit.

Once the solution of dissolved components is passed through the membrane is step e), a concentrated solution of dissolved components is retained on one side of the membrane. Further solvent may be removed from this concentrated solution, for example, by thermal methods, such as distillation. Alternatively or additionally, additional membrane units may be employed.

The concentrated solution of dissolved components may be re-diluted prior to contact with the membrane in step e). Any suitable method of re-dilution may be employed. Preferably, however, the concentrated solution is recycled to one of the additional osmosis unit(s), the further osmosis unit(s) or the other osmosis unit(s) used to dilute the concentrated solution of dissolved components as discussed above.

During operation of the process of the present invention, fouling of the selectively permeable membrane(s), for example, in steps b) and c) may occur. The membranes may be cleared simply by backwashing allowing the membranes to be cleaned conveniently online. Cleaning may be achieved by, for example, reducing the osmotic potential of the draw solution, for instance, by diluting the draw solution. Alternatively or additionally, the solute concentration of the feed solution may be increased, for example, by fluctuating the operating pressure. Alternatively or additionally, the solute concentration of the solutions on either side of the membrane may be varied to allow solvent to back diffuse from the draw solution side to the feed solution side, thereby backwashing the membrane.

According to a second aspect of the present invention, there is provided a process for separating a solvent from a solution, said process comprising
 a) providing an osmosis unit comprising a selectively permeable membrane,
 b) contacting a source solution with one side of the selectively permeable membrane,
 c) contacting a draw solution having a higher solute concentration (higher osmotic potential) than the source solution with the opposite side of the membrane, such that solvent from the source solution passes across the membrane to dilute the draw solution,
 d) introducing a portion of the concentrated source solution into a solar pond and irradiating the pond with solar energy, such that concentration and temperature gradients are established, whereby the temperature and concentration of solute at the base of the pond are greater than the temperature and concentration of solute at the surface of the pond,
 e) removing a portion of the solution from the base of the pond and using the heat generated therein to heat a portion of the diluted draw solution from step c) to aid or cause thermal separation of the draw solution into a distillate stream having a reduced solute concentration and a residual stream having an increased solute concentration,
 f) recovering the distillate stream, and
 g) recycling the residual stream to the draw solution side of the osmosis unit.

Any suitable membrane may be used in the osmosis unit of step a). Preferably, the membrane employed has an average pore size of from 1 to 80 Angstroms, more preferably, 2 to 50 Angstroms. In a preferred embodiment, the membrane has an average pore size of from 5 to 30 Angstroms. The pore size of the membrane may be selected depending on the size of the solutes that require separation.

Suitable selective membranes include integral membranes and composite membranes. Specific examples of suitable membranes include membranes formed of cellulose acetate (CA), cellulose triacetate (CTA), such as/similar to those used in the study of McCutcheon et al., Desalination 174 (2005) 1-11 and membranes formed of polyamide (PA). An array of membranes may be employed. Other examples of suitable membranes for the osmosis unit(s) include Toyobo Hollow Fibre both open ended tubular modules (Hollowsep).

The membrane may be planar or take the form of a tube or hollow fibre. If desired, the membrane may be supported on a supporting structure, such as a mesh support.

In one embodiment, one or more tubular membranes may be disposed within a housing or shell. The first solution may be introduced into the housing, whilst the second solution may be introduced into the tubes. As the solute concentration of the draw solution is higher (i.e. the solution has a higher osmotic potential) than that of the source solution, solvent will diffuse across the membrane from the source solution into the draw solution. Thus, the draw solution will become increasingly diluted and the source solution, increasingly concentrated. The diluted draw solution may be recovered from the housing, whilst the concentrated source solution may be removed from the interior of the tubes.

When a planar membrane is employed, the sheet may be rolled such that it defines a spiral in cross-section.

In step b), a source solution is contacted with one side of the selectively permeable membrane. Any suitable source solution may be employed. The source solution may be seawater, brackish water, river water, lake water and waste streams from industrial or agricultural processes. Mixtures of such streams may also be employed. The source solution may be pretreated, for example, by membrane filtration, to remove suspended particles. Alternatively other conventional pre-treatment techniques may be used. Chemicals may also be added to the source solution to prevent or inhibit biological fouling and/or scaling.

In a preferred embodiment, seawater is used as the source solution.

In step c), a draw solution is contacted with the opposite side of the selectively permeable membrane. The draw solution has a higher solute concentration than the source solution. Accordingly, the difference in osmotic potential causes solvent (e.g. water) from the source solution to flow across the membrane to dilute the draw solution. A concentrated solution of source solution is left on the other side of the membrane.

Any suitable draw solution may be employed. In one embodiment, the draw solution is formed by dissolving components or solutes in a solvent, such as water. Suitable components include organic compounds and inorganic compounds. Suitable organic compounds include sugars, such as glucose, fructose and sucrose.

Suitable inorganic compounds include acids, bases and salts. Mixtures of two or more inorganic compounds may be employed. In a preferred embodiment, salts are employed.

The salt may be a metal salt or an ammonium salt. Suitable metal salts include salts of Groups I to III metals.

Examples of suitable Group I metal salts include salts of sodium and potassium. Examples of suitable Group II metal salts include salts of magnesium, calcium, strontium and barium. Examples of suitable Group III salts include salts of aluminium. Salts of complex cations may also be employed.

Where ammonium salts are employed, such salts may be salts of substituted or unsubstituted ammonium ions. Where substituted ammonium ions are used, these may be substituted with alkyl groups, such as $C_1$ to $C_{20}$ alkyl groups.

The salts may be formed of cations having an average diameter of greater than 10 Angstroms in solvated (e.g. hydrated) form. Preferably, the metal cations have diameters from 11 to 100 Angstroms, more preferably, from 15 to 50 Angstroms in solvated (e.g. hydrated) form.

Suitable anionic species include fluorides, chlorides, bromides, iodides, sulphates, sulphites, sulphides, carbonates, hydrogencarbonates, nitrates, nitrites, nitrides, phosphates, hydrogenphosphates, aluminates, borates, bromates, carbides, chlorides, perchlorates, hypochlorates, chromates, fluorosilicates, fluorosilicates, fluorosulphates, silicates, cyanides and cyanates.

The anions preferably have an average diameter of at least 5 Angstroms in solvated form. Preferably, the anions have diameters from 5 to 50 Angstroms, more preferably, from 10 Angstroms to 40 Angstroms, and more preferably, 20 to 30 Angstroms in solvated form.

Preferred salts include magnesium sulfate ($MgSO_4.6H_2O$ or $MgSO_4.7H_2O$), magnesium chloride ($MgCl_2.6H_2O$), sodium sulfate ($Na_2SO_4.10H_2O$), calcium chloride ($CaCl_2.2H_2O$ or $CaCl_2.6H_2O$), Borax ($Na_2B_4O_7$) disodium hydrogenphosphate ($Na_2HPO_4.12H_2O$) and potassium alum ($24H_2O$)

Water soluble polymers may also be used as the dissolved components.

Additionally, anti-microbial agent(s), anti-corrosion agent(s), pH adjuster(s) and anti-scaling agent(s) may be added to the draw solution. Examples of suitable additives include acids, such as carboxylic acids; alkalis, such as hydroxides; polymers, such as xanthan gum, polyacrylamide and dextrin; protein, lipoprotein, lipid and glyco-lipid surfactants; and anti-scaling agents, such as penta-phosphonate. These additives may be re-used in the process of the present invention they will be recycled in a closed loop.

In certain embodiments of the invention, steps are taken to ensure that the concentration and/or osmotic potential of the draw solution is at its target value prior to contact with the membrane. For example, the solution may be treated by electrodialysis, electrodialysis reversal and electrochemical treatment (e.g. capacitive deionisation and ion-exchange). Alternatively or additionally, the temperature and/or pH of the solution may be controlled so as to alter the concentration of the solution accordingly and/or its osmotic pressure (potential).

In step d), a portion of the concentrated source solution is into a solar pond. When the pond is irradiated with solar energy, concentration and temperature gradients are established, whereby the temperature and concentration of solute at the base of the pond are greater than the temperature and concentration of solute at the surface of the pond.

Preferably, the temperature at the base of the pond is 50 to 100° C., more preferably 60 to 90° C., and most preferably 80 to 90° C.

The solar energy used to establish the necessary temperature and concentration gradients may be supplemented with other forms of energy, such as wind energy. Salts (e.g. soil salts) may also be added to the solar pond to maintain the desired concentration gradient. Alternatively or additionally, waste streams from industrial plants with high salt concentrations may be introduced into the solar pond. Examples of suitable streams include salt streams from desalination plants and blow down from cooling towers. A suitable solar pond is described in U.S. Pat. No. 4,244,351, where the pond is saturated with a salt having a solubility which is a direct function of temperature. Suitable solar ponds are also described in U.S. Pat. No. 4,408,459 and U.S. Pat. No. 4,244,351.

In step e), a portion of the solution from the base of the pond is removed. The removed portion may be used as a heat source in a thermal separation unit, such as a distillation column. The heat generated in the base of the pond is used to heat a portion of the diluted draw solution from step c) by, for example, heat exchange. This heating step aids or causes thermal separation of the diluted draw solution. By distilling the diluted draw solution in this way, a distillate stream having a reduced solute concentration and a residual stream having an increased solute concentration are produced. If necessary, an additional heat source may be used to heat the diluted draw solution in the thermal separation step. Membrane separation methods may also be used to purify the diluted draw solution.

The distillate stream is recovered in step f). Preferably, the distillate stream is a clean water stream that may be used for drinking, washing or irrigation purposes. Heat from the distillate stream may be transferred to the diluted draw solution before it is introduced into the thermal separation unit as a pre-heating step. This pre-heating step may be carried out in a heat exchanger.

The residual stream from the distillation step may be recycled to the osmosis unit of step a). The temperature of the residual stream may be controlled prior to being introduced into the osmosis unit, for example, by heating or cooling using a heat exchanger. In one embodiment, the residual stream is brought to a temperature of 80 to 100° C., preferably 40 to 90° C. before being recycled to the osmosis unit of step a).

These and other aspects of the invention will now be described with reference to the drawings in which.

Figure 1:
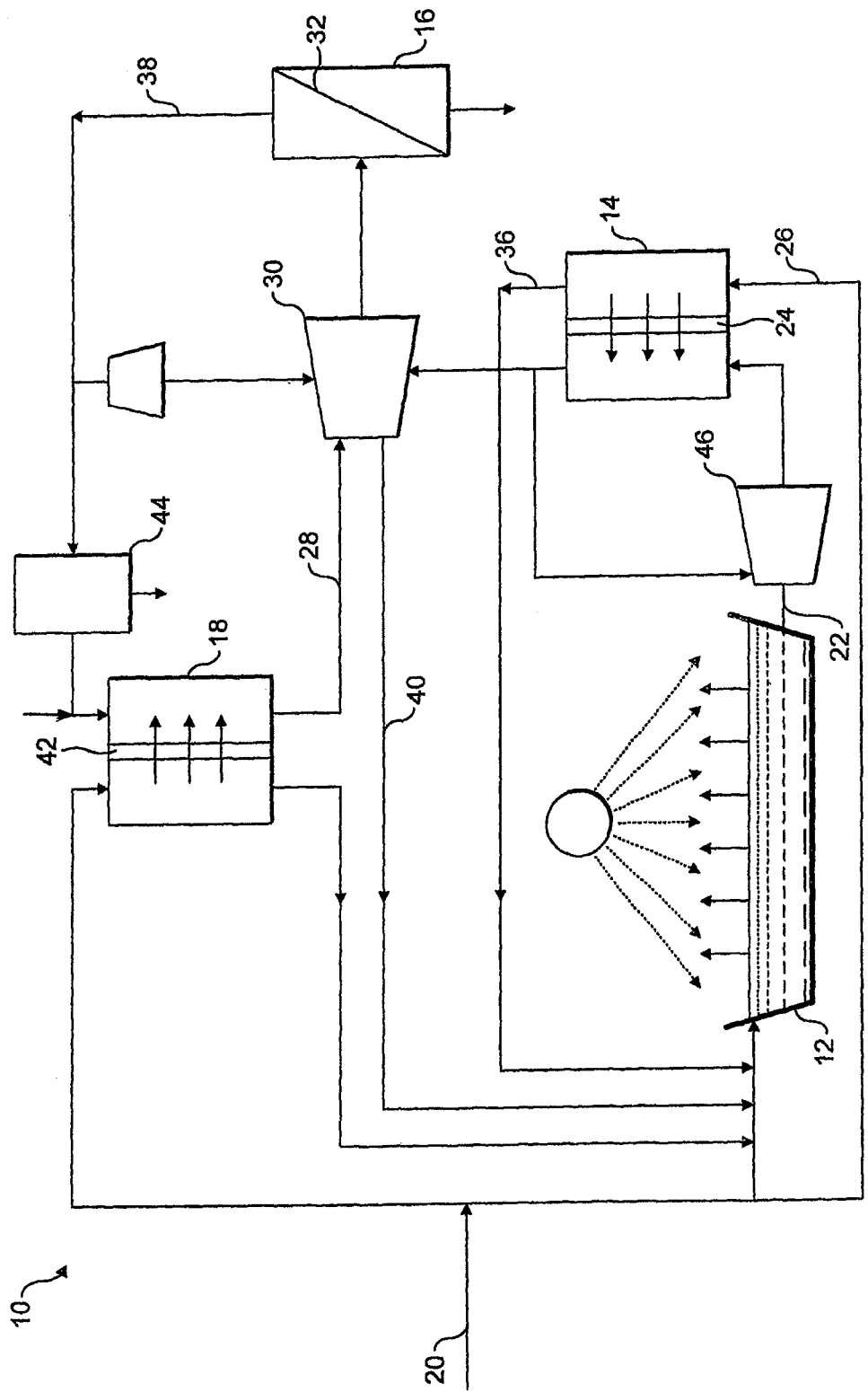
FIG. 1 is a schematic drawing of an apparatus for carrying out a process according to a first embodiment of the first aspect of the present invention.

Reference is first made to FIG. 1. The drawing depicts an apparatus 10 comprising a solar pond 12, a first osmosis unit 14, a nanofiltration unit 16 and an additional osmosis unit 18.

In operation, seawater 20 is introduced into the solar pond 12 and subjected to solar energy. As a result of this irradiation, concentration and temperature gradients are established in the pond, whereby the seawater at the base of the pond 12 is of a higher concentration and temperature than the seawater at the surface of the pond 12.

The seawater 20 from the base of the solar pond 12 may be removed as stream 22 and introduced into a first osmosis unit 14. In the first osmosis unit 14, the stream 22 is contacted with one side of a selectively permeable membrane 24. Stream 22 has a higher solute concentration than the initial seawater stream 20. Thus, when a second portion 26 of the initial seawater stream (second solution) is contacted with the opposite side of the membrane 24, water from the second solution 26 flows across the membrane 24 by osmosis, diluting and pressurising concentrated stream 22 from the solar pond 12. The solutes in the second solution 26 are selectively prevented from passing through the membrane 24, leaving a concentrate that is recycled to the solar pond 12 via line 36.

A small proportion of the pressure generated in stream 22 may be used to drive seawater from the base of the pond into the first osmosis unit 14 (see pressure exchange system 46). However, the bulk of the pressure generated in stream 22 is transferred to a solution of magnesium sulphate (dissolved components) 28 by a pressure exchange system 30. Once pressurised, the solution of magnesium sulphate 28 is driven through a nanofiltration membrane 32 in the nanofiltration unit 16. The nanofiltration membrane 32 allows water from the solution to pass through the membrane 32 as a clean water stream. Once the pressure has been transferred from stream 22, the stream is recycled to the solar pond 12 via line 40.

The solution of magnesium sulphate 28 is formed using water from seawater 20. Seawater 20 is introduced into the additional osmosis unit 18 (located at sub-sea level) and contacted with a selectively permeable membrane 42.

A concentrated solution of magnesium sulphate is contacted with the opposite side of the membrane 42. The magnesium sulphate solution has a higher solute concentration than seawater 20. Accordingly, water from the seawater flows across the membrane to dilute the magnesium sulphate solution. The diluted magnesium sulphate solution is introduced into the nanofiltration unit 16 as stream 28.

As described above, the nanofiltration membrane 32 allows water from the magnesium sulphate solution 28 to pass through the membrane 32 as a clean water stream 34. A concentrated solution of magnesium sulphate 38 is left on the other side of the nanofiltration membrane 32. This concentrate 38 is recycled to the additional osmosis unit 18. Prior to being reintroduced into the additional osmosis unit 18, however, more clean water is removed from the concentrate 38 by distillation in a thermal unit 44. A portion of the concentrate 38 may be recycled to the nanofiltration unit 16. However, a pressure exchange system may be used to bring the recycled concentrate to the appropriate pressure.

Figure 2:
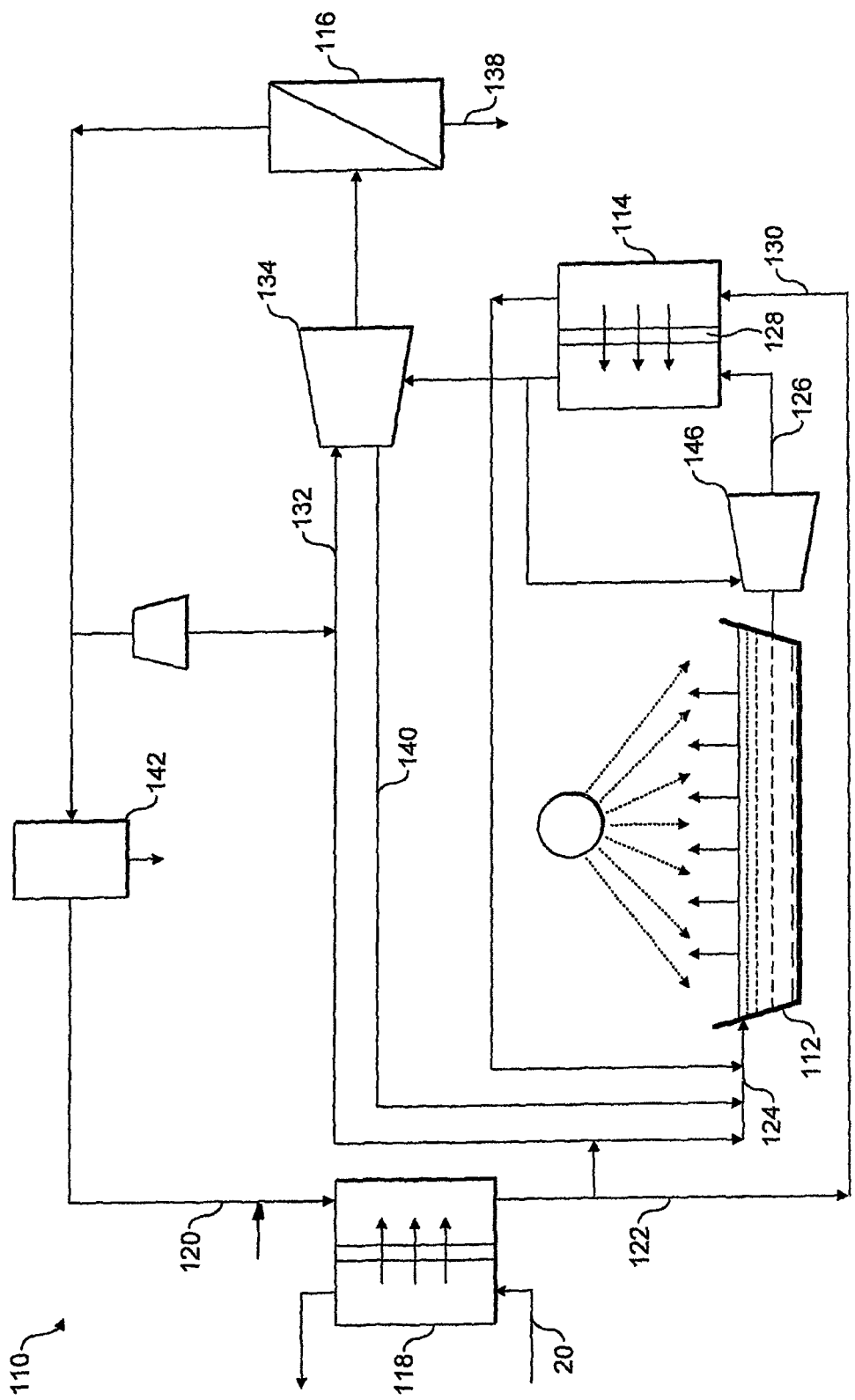
FIG. 2 is a schematic drawing of an apparatus for carrying out a process according to a second embodiment of the first aspect of the present invention.

Reference is now made to FIG. 2. The drawing depicts an apparatus 110 comprising a solar pond 112, a first osmosis unit 114, a nanofiltration unit 116 and a further osmosis unit 118.

In operation, seawater 20 (optionally pre-treated to remove suspended particles and inhibit biological fouling and scaling) is introduced into the osmosis unit 118. In the osmosis unit 118, the seawater 20 is contacted with one side of a selectively permeable membrane. A concentrated solution of magnesium sulphate 120 is contacted with the opposite side of the selectively permeable membrane. As the solute concentration in the concentrated magnesium sulphate solution 120 is greater than that of seawater 20, water flows from the seawater side of the membrane to dilute the magnesium sulphate solution. The diluted magnesium sulphate solution is removed from the osmosis unit 118 as stream 122. As a result, the seawater becomes more concentrated and may be used as a feed to an additional solar pond.

A portion (first solution) of stream 122 is introduced into the solar pond 112 via line 124 and subjected to solar energy. As a result of this irradiation, concentration and temperature gradients are established in the pond, whereby the solution at the base of the pond 112 is of a higher concentration and temperature than the solution at the surface of the pond 112.

The solution 124 from the base of the solar pond 12 is removed and introduced into the first osmosis unit 114 as stream 126. In the first osmosis unit 114, the stream 126 is contacted with one side of a selectively permeable membrane 128. Stream 126 has a higher solute concentration than the solution 122 emerging from the osmosis unit 118. Thus, when a second portion 130 of the solution 122 (second solution) is contacted with the opposite side of the membrane 128, water from the second solution 130 flows across the membrane 128 by osmosis, diluting and pressurising stream 126 from the solar pond 112. The solutes in the second solution 130 are selectively prevented from passing through the membrane 128, leaving a concentrate that is recycled to the solar pond 112.

A small proportion of the pressure generated in stream 126 may be used to drive the solution from the base of the pond 112 into the first osmosis unit 114 (see pressure exchange system 146). However, the bulk of the pressure generated in stream 126 is transferred to a third portion 132 (solution of dissolved components) of the magnesium sulphate solution 122 from the osmosis unit 118 by a pressure exchange system 134. Once pressurised, the solution of magnesium sulphate 132 is driven through a nanofiltration membrane in the nanofiltration unit 116. The nanofiltration membrane allows water from the solution to pass through the membrane as a clean water stream 138. Once the pressure has been transferred from stream 126, the stream 126 is recycled to the solar pond 112 via line 140.

Although the nanofiltration membrane in the nanofiltration unit 116 allows water from the magnesium sulphate solution 132 to pass through the membrane as a clean water stream 138, magnesium sulphate is prevented from passing through the nanofiltration membrane. Accordingly, a concentrated solution of magnesium sulphate 120 is left on the other side of the nanofiltration membrane. This concentrate 120 is recycled to the osmosis unit 118. Prior to being reintroduced into the additional osmosis unit 118, however, more clean water is removed from the concentrate 120 by distillation in a thermal unit 142. A portion of the concentrate 120 may be recycled to the nanofiltration unit 116. However, a pressure exchange system may be used to bring the recycled concentrate to the appropriate pressure.

Figure 3:
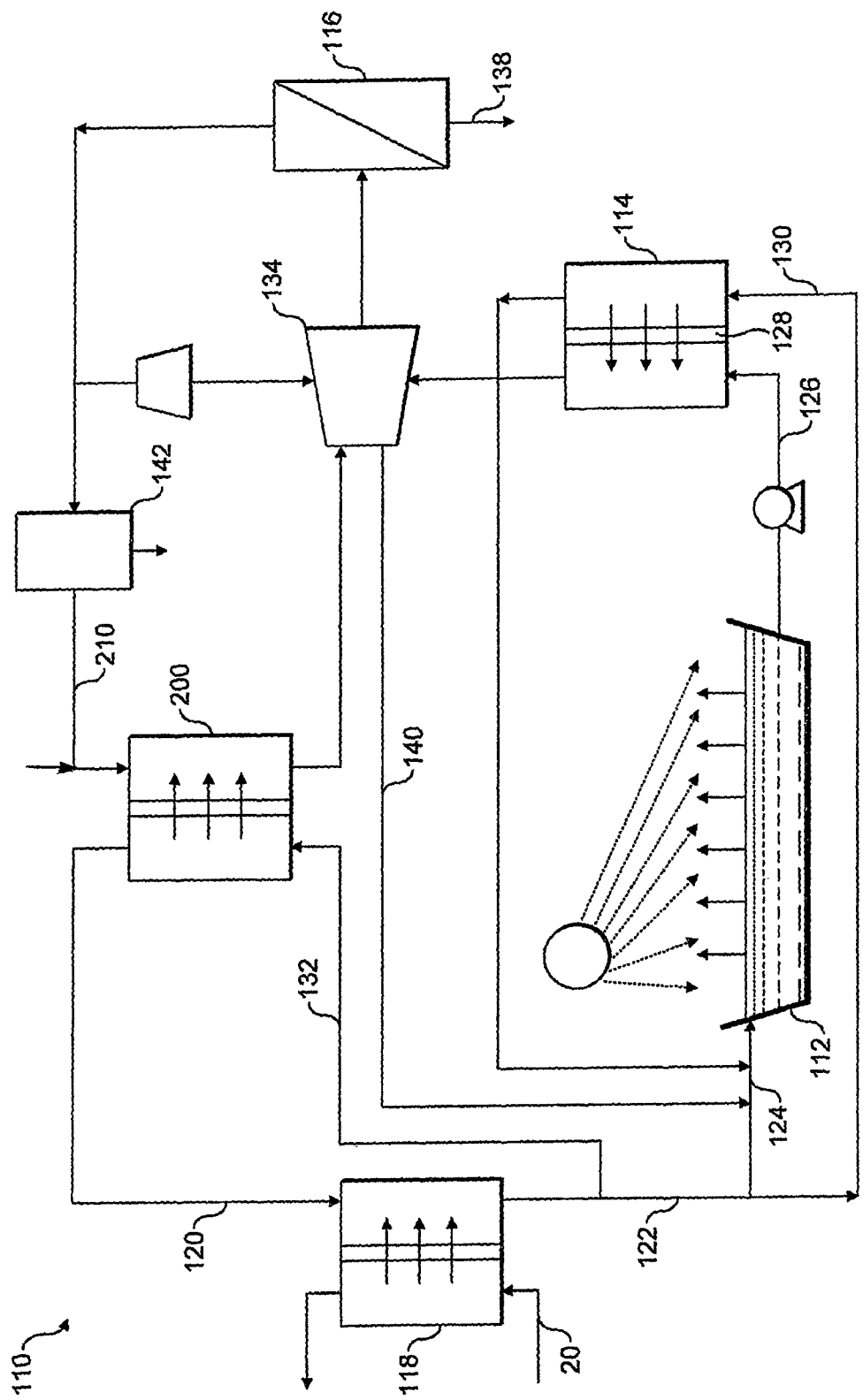
FIG. 3 is a schematic drawing of an apparatus for carrying out a process according to a third embodiment of the first aspect of the present invention.

Reference is now made to FIG. 3 of the drawings. The apparatus shown in this Figure is similar to the apparatus shown in FIG. 2 and like parts have been labelled with like numerals. Unlike the apparatus of FIG. 2, however, the apparatus of FIG. 3 comprises another osmosis unit 200. In FIG. 2, a portion 132 of the magnesium sulphate solution from the first osmosis unit 118 is introduced directly into the nanofiltration unit 116 via the pressure exchange system 134. In the apparatus of FIG. 3, on the other hand, the portion 132 of magnesium sulphate solution is not fed directly to the nanofiltration unit 116, but used to form a solution of dissolved components that is fed into the nanofiltration unit 116. Specifically, the portion 132 of, magnesium sulphate solution from the osmosis unit 118 is introduced into the osmosis unit 200 and contacted with one side of a selectively permeable membrane. A concentrated solution of dissolved components 210 is contacted with the opposite side of the membrane. As solution 210 is more concentrated that the magnesium sulphate solution 132, water flows across the membrane by osmosis to dilute the solution 210. This flow of water leaves a concentrated magnesium sulphate solution that is recycled to the osmosis unit 118.

Once diluted, the solution 210 is then introduced into the nanofiltration unit 216 via the pressure exchange system 134. The nanofiltration membrane in the nanofiltration unit 116 allows water from the solution 210 to pass through the membrane as a clean water stream 138. However, the dissolved components (such as magnesium sulfate ($MgSO_4.6H_2O$ or $MgSO_4.7H_2O$), magnesium chloride ($MgCl_2.6H_2O$), sodium sulfate ($Na_2SO_4.10H_2O$), calcium chloride ($CaCl_2.2H_2O$ or $CaCl_2.6H_2O$), disodium hydrogenphosphate ($Na_2HPO_4.12H_2O$), potassium alum ($24H_2O$), Borax ($Na_2B_4O_7$), glucose, fructose, sucrose and water soluble polymers such as polyethylene oxide and other water-soluble polymers such as polyvinylpyrrolidone, polyethyl oxazoline, polydiallydimethyl ammonium and polyacrylamide) are prevented from passing through the nanofiltration membrane.

Accordingly, a concentrate is left on the other side of the nanofiltration membrane, which is recycled to the osmosis unit 200. Prior to being reintroduced into the osmosis unit 200, however, more clean water is removed from the concentrate by distillation in a thermal unit 142. A portion of the concentrate may be recycled to the nanofiltration unit 116. However, a pressure exchange system may be used to bring the recycled concentrate to the appropriate pressure.

Figure 4:
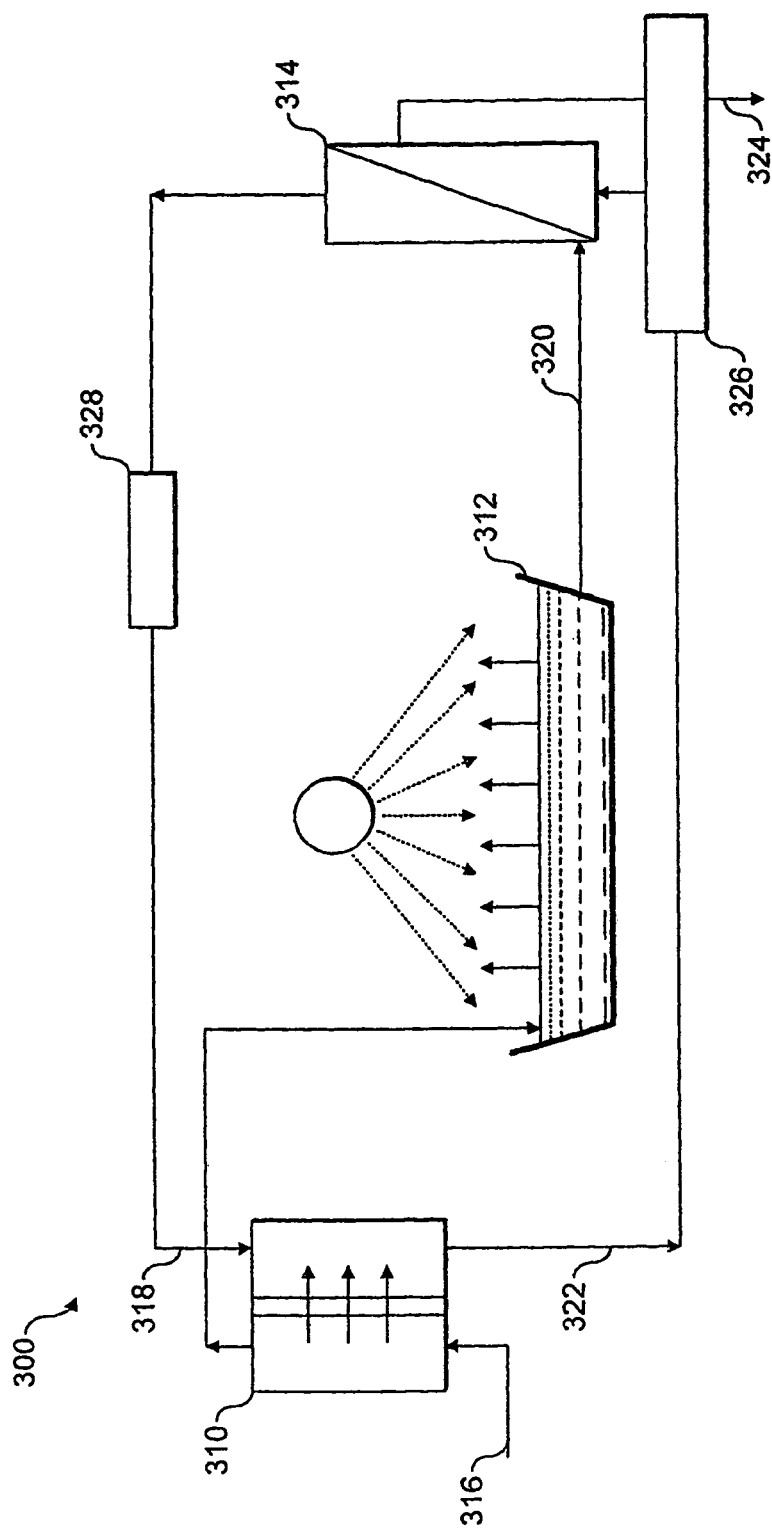
FIG. 4 is a schematic drawing of an apparatus for carrying out a process according to a first embodiment of the second aspect of the present invention.

Reference is now made to FIG. 4. The drawing depicts an apparatus 300 comprising an osmosis unit 310, a solar pond 312 and a thermal separation unit 314.

In operation, a source solution 316 consisting of seawater is introduced into the osmosis unit 310. In the osmosis unit 310, the seawater 316 is contacted with one side of a selectively permeable membrane. A concentrated solution of magnesium sulphate (draw solution) 318 is contacted with the opposite side of the selectively permeable membrane. The draw solution 318 has a higher solute concentration than the seawater stream 316. This difference in osmotic potential causes water from the seawater side of the membrane to flow across the membrane to dilute the draw solution 318. A concentrated seawater solution is left on the seawater side of the membrane.

A portion of the concentrated seawater solution 320 is removed from the osmosis unit 310 and introduced into the solar pond 312. The solar pond 312 is irradiated with solar energy, such that concentration and temperature gradients are established, whereby the temperature and concentration of solute at the base of the pond 312 are greater than the temperature and concentration of solute at the surface of the pond 312.

A portion of the hot solution 320 from the base of the pond 312 is removed and introduced into the thermal separation unit 314. The heat from the removed solution is used as a heat source for the distillation of the diluted draw solution 322. This distillation step produces a distillate stream 324 having a reduced solute concentration and a residual stream having an increased solute concentration. Membrane separation techniques may also be used to purify the distillate stream.

The distillate stream 324 is recovered as a clean water stream. The heat from the distillate stream 324 is used to heat the diluted draw solution 322 before it enters the thermal separation unit 314 in a heat exchanger 326.

The residual stream is recycled to the draw solution side of the osmosis unit 310. Before being introduced into the osmosis unit 310, the temperature of the residual stream is controlled using a heat exchanger 328.

The invention claimed is:

1. A process for separating dissolved components from a solution, said process comprising
   a) providing an initial solution selected from one or more of seawater, brackish water, river water, lake water and waste streams from industrial or agricultural processes and introducing a first portion of the initial solution as a first solution into a solar pond and irradiating the first solution with solar energy, such that temperature and concentration gradients are established, whereby the temperature and concentration of solute at the base of the pond is greater than the temperature and concentration of solute at the surface of the pond,
   b) introducing a portion of the first solution from the solar pond into a first osmosis unit, and contacting the portion with one side of a selectively permeable membrane,
   c) contacting the other side of the selectively permeable membrane with a second solution that is a second portion of the initial solution, the second solution having a lower solute concentration than the portion of first solution from the solar pond, such that solvent from the second solution passes across the membrane to dilute and pressurize the portion of first solution,
   d) removing the diluted portion of first solution from the first osmosis unit,
   e) contacting a third portion of the initial solution with one side of a selectively permeable membrane in a second osmosis unit and contacting a concentrated solution of dissolved components with the opposite side of the selectively permeable membrane in the second osmosis unit, the concentrated solution having a solute concentration that is higher than the solute concentration of the third portion, the solvent from the third portion passing across the selectively permeable membrane to dilute the concentrated solution of dissolved components and form a third solution, and
   f) using a pressure exchange system to transfer the pressure generated in the diluted portion of the first solution to the third solution of dissolved components, so as to drive the third solution of dissolved components through a membrane to separate at least some of the dissolved components from the third solution.

2. The process as claimed in claim 1, wherein the membrane in step f) is a nanofiltration membrane or a reverse osmosis membrane.

3. The process as claimed in claim 1, wherein a second pressure exchange system is used to transfer the pressure generated in the diluted portion of the first solution to the portion of the first solution from the pond, so as to drive the portion of first solution from the pond into the first osmosis unit in step b).

4. The process as claimed in claim 1, which comprises recycling the second solution from the first osmosis unit to the solar pond.

5. The process as claimed in claim 1, wherein the initial solution is treated to remove suspended particles and to reduce the risk of biological fouling and corrosion.

6. The process as claimed in claim 1, wherein the second osmosis unit is submerged or installed at sub-sea level.

7. The process as claimed in claim 1, wherein, once the solvent from the third portion of the initial solution has passed across the selectively permeable membrane of the second osmosis unit, the concentrated initial solution is recycled to the solar pond.

8. The process as claimed in claim 1, wherein a third portion of the initial solution produced is used as the third solution of dissolved components.

9. The process as claimed in claim 1, wherein the third solution of dissolved components is a solution of at least one of magnesium sulfate, sodium sulfate, calcium chloride, potassium alum, disodium hydrogenphosphate, glucose, fructose, sucrose, sodium chloride and potassium chloride.

10. The process as claimed in claim 1, wherein in step b) the portion of the first solution is removed from the base of the pond.

11. The process as claimed in claim 1, wherein the portion of first solution is recycled directly or indirectly to the solar pond after step f).

12. The process as claimed in claim 1, wherein the second solution is also at a lower temperature than the portion of first solution on the opposite side of the membrane.

13. The process as claimed in claim 1, wherein the selectively permeable membrane used in steps b) and c) is a tubular hollow fine fiber membrane.

14. The process as claimed in claim 1, wherein the third solution of dissolved components is treated to ensure that its concentration and/or osmotic potential is at a target value prior to contact with the membrane.

15. The process as claimed in claim 14, wherein the third solution of dissolved components is treated by electrodialysis, electrodialysis reversal, electrochemical treatment, temperature control and/or pH control to ensure that its concentration and/or osmotic potential is at said target value.

* * * * *